(12) United States Patent
Daga et al.

(10) Patent No.: US 11,239,639 B2
(45) Date of Patent: Feb. 1, 2022

(54) ASSEMBLY AND METHOD FOR SEALING A BUNDLE OF WIRES

(71) Applicant: Tyco Electronics Corporation, Berwyn, PA (US)

(72) Inventors: Vijay Daga, Sunnyvale, CA (US); Jaydip Das, Cupertino, CA (US); Kavitha Bharadwaj, Fremont, CA (US); Ting Gao, Palo Alto, CA (US); Quentin F. Polosky, Santa Clara, CA (US); Henry Paul S. Cervantes, Santa Clara, CA (US)

(73) Assignee: TE Connectivity Services GMBH, Schaffhausen (CH)

( * ) Notice: Subject to any disclaimer, the term of this patent is extended or adjusted under 35 U.S.C. 154(b) by 188 days.

(21) Appl. No.: 15/282,670

(22) Filed: Sep. 30, 2016

(65) Prior Publication Data

US 2018/0097344 A1 Apr. 5, 2018

(51) Int. Cl.
*H02G 3/04* (2006.01)
*B60R 16/02* (2006.01)
(Continued)

(52) U.S. Cl.
CPC .......... *H02G 3/0418* (2013.01); *B29C 35/02* (2013.01); *B29C 35/0805* (2013.01);
(Continued)

(58) Field of Classification Search
CPC .. H02G 3/0418; H02G 15/013; H02G 3/0487; B29C 35/0805; B29C 35/02;
(Continued)

(56) References Cited

U.S. PATENT DOCUMENTS 2,932,685 A 4/1960 Raila et al.
3,123,663 A 3/1964 Muldoon
(Continued)

FOREIGN PATENT DOCUMENTS

DE 3940698 C1 5/1991
DE 19923464 A1 12/2000
(Continued)

OTHER PUBLICATIONS

"RayBlock 85, Heat-shrinkable Water-blocking System", Raychem, 2002, 2 pgs.
(Continued)

*Primary Examiner* — Leith S Shafi
(74) *Attorney, Agent, or Firm* — Saxton & Stump LLC

(57) ABSTRACT

A sealing assembly for sealing a bundle of wires includes a first sheet formed of a sealant material, a second sheet disposed above the first sheet, and a third sheet disposed above the second sheet formed of the sealant material. The second sheet includes a thermally conductive material. When the bundle of wires is overlaid on the assembly in a first direction, and the assembly is wrapped in a second direction that is generally perpendicular to the first to thereby surround the wires, the second sheet facilitates enhanced thermal energy distribution of applied heat throughout the assembly to thereby more uniformly melt the sealant material and thereby fill voids between the wires.

18 Claims, 14 Drawing Sheets

(51) Int. Cl.

| | |
|---|---|
| *H01B 7/285* | (2006.01) |
| *H02G 15/013* | (2006.01) |
| *H01B 7/28* | (2006.01) |
| *H01B 7/00* | (2006.01) |
| *B29C 35/02* | (2006.01) |
| *B29C 35/08* | (2006.01) |
| *B29C 63/00* | (2006.01) |
| *B29C 63/06* | (2006.01) |
| *H01B 13/00* | (2006.01) |
| *B29D 99/00* | (2010.01) |
| *B29K 105/00* | (2006.01) |
| *B29L 31/34* | (2006.01) |

(52) U.S. Cl.
CPC .......... *B29C 63/0065* (2013.01); *B29C 63/06* (2013.01); *B60R 16/0215* (2013.01); *H01B 7/0045* (2013.01); *H01B 7/28* (2013.01); *H01B 7/285* (2013.01); *H01B 13/0036* (2013.01); *H02G 15/013* (2013.01); *B29C 2035/0811* (2013.01); *B29C 2035/0822* (2013.01); *B29D 99/0053* (2013.01); *B29K 2105/256* (2013.01); *B29L 2031/3462* (2013.01)

(58) Field of Classification Search
CPC ................ B29C 63/06; B29C 63/0065; B29C 2035/0822; B29C 2035/0811; H01B 7/0045; H01B 7/28; H01B 13/0036; H01B 7/285; B60R 16/0215; B29D 99/0053; B29K 2105/256; B29L 2031/3462; F16L 57/04
USPC .................................................. 138/128–136
See application file for complete search history.

(56) References Cited

U.S. PATENT DOCUMENTS

| | | | |
|---|---|---|---|
| 4,237,609 A | 12/1980 | Clabburn et al. | |
| 4,380,686 A * | 4/1983 | Moisson ............ | H02G 15/1806 174/84 R |
| 4,409,430 A * | 10/1983 | Boscher ............... | H02G 15/192 156/53 |
| 4,498,938 A | 2/1985 | Moisson et al. | |
| 4,501,927 A | 2/1985 | Sievert | |
| 4,693,767 A | 9/1987 | Grzanna et al. | |
| 4,865,920 A * | 9/1989 | Sweet .................... | C08K 5/101 428/447 |
| 4,972,042 A * | 11/1990 | Seabourne ........... | G02B 6/4428 174/23 R |
| 4,993,149 A | 2/1991 | Zilligen et al. | |
| 4,997,689 A | 3/1991 | Langen et al. | |
| 5,140,746 A | 8/1992 | Debbaut | |
| 5,143,122 A | 9/1992 | Adkins | |
| 5,143,761 A | 9/1992 | Chiotis et al. | |
| 5,378,879 A * | 1/1995 | Monovoukas ......... | B29C 35/08 156/379.7 |
| 5,431,758 A | 7/1995 | Delalle | |
| 5,597,620 A | 1/1997 | Martino | |
| 5,922,992 A | 7/1999 | Kinney et al. | |
| 6,079,991 A | 6/2000 | Lemke et al. | |
| 6,107,573 A | 8/2000 | Uchiyama et al. | |
| 6,139,336 A | 10/2000 | Olson | |
| 6,666,732 B1 | 12/2003 | Endacott | |
| 6,869,292 B2 | 3/2005 | Johnescu et al. | |
| 7,230,214 B2 | 6/2007 | Kirby | |
| 7,364,478 B2 | 4/2008 | Xu | |
| 7,834,268 B2 | 11/2010 | Ootsuki | |
| 7,896,712 B2 | 3/2011 | Cecil et al. | |
| 8,951,063 B2 | 2/2015 | Iio | |
| 2007/0128925 A1 | 6/2007 | Graeve et al. | |
| 2011/0177727 A1 | 7/2011 | Zhao | |
| 2016/0013596 A1 | 1/2016 | Regnier | |
| 2017/0200536 A1 | 7/2017 | Yabe et al. | |
| 2018/0097344 A1 | 4/2018 | Daga | |
| 2018/0109099 A1 | 4/2018 | Fukumoto et al. | |

FOREIGN PATENT DOCUMENTS

| | | |
|---|---|---|
| EP | 0057582 B1 | 8/1985 |
| EP | 0 158 519 A2 | 10/1985 |
| EP | 0159945 A2 | 10/1985 |
| EP | 0 249 510 A1 | 12/1987 |
| EP | 0267028 | 5/1988 |
| EP | 0270283 | 6/1988 |
| EP | 0332821 A2 | 9/1989 |
| EP | 0518032 | 12/1992 |
| EP | 0 541 530 A1 | 5/1993 |
| FR | 2 627 026 A1 | 8/1989 |
| GB | 2075771 B | 11/1981 |
| JP | S579210 A | 1/1982 |
| JP | H10329216 A | 12/1998 |
| WO | 88/09068 A1 | 11/1988 |
| WO | 90/06977 A1 | 6/1990 |
| WO | 9723924 | 7/1997 |
| WO | 9954962 A1 | 10/1999 |
| WO | 2017053944 | 3/2017 |

OTHER PUBLICATIONS

"RayBlock 85 Sealing Kit", Protection Products Harness Design, Catalog 1654296-3, Oct. 2012, 2 pgs.
"RBK-RTP-125 Tubing", Protection Products Harness Design, Catalog 1654296-3, Oct. 20, 2012, 2 pgs.
"RayBlock 105 Sealing Kit", Protection Products Harness Design, Catalog 1654296-3, Oct. 20, 2012, 2 pgs.
"Flexible, Flame-Retardant, Dual-Color, Polyolefin Tubing", Raychem Tubing Products, DCPT, Apr. 2016, 2 pgs.
"Standard Test Methods for Softening Point of Resins by Ring-and-Ball Apparatus", ASTM Designation: E28-97, 1997, pp. 678-683.
"Operating Instructions: AD-3050 Seal Test Equipment," 24 pages (2012), Available at http://www.te.com/commerce/DocumentDelivery/DDEController?Action=srchrtrv&DocNm=412-94165-1%DocType=SS&DocLang=English.
U.S. Appl. No. 15/426,552, filed Feb. 7, 2017.
U.S. Appl. No. 15/493,342, filed Apr. 21, 2017.
U.S. Appl. No. 15/957,298, filed Apr. 19, 2018.
International Search Report, International Application No. PCT/US2017/053971, International Filing Date Sep. 28, 2017.
JP Notice of Reasons for Refusal for JP Application No. 2019-538104 dated Oct. 27, 2020.
EP Search Report, dated Jul. 2, 2021, 5 pgs.

* cited by examiner

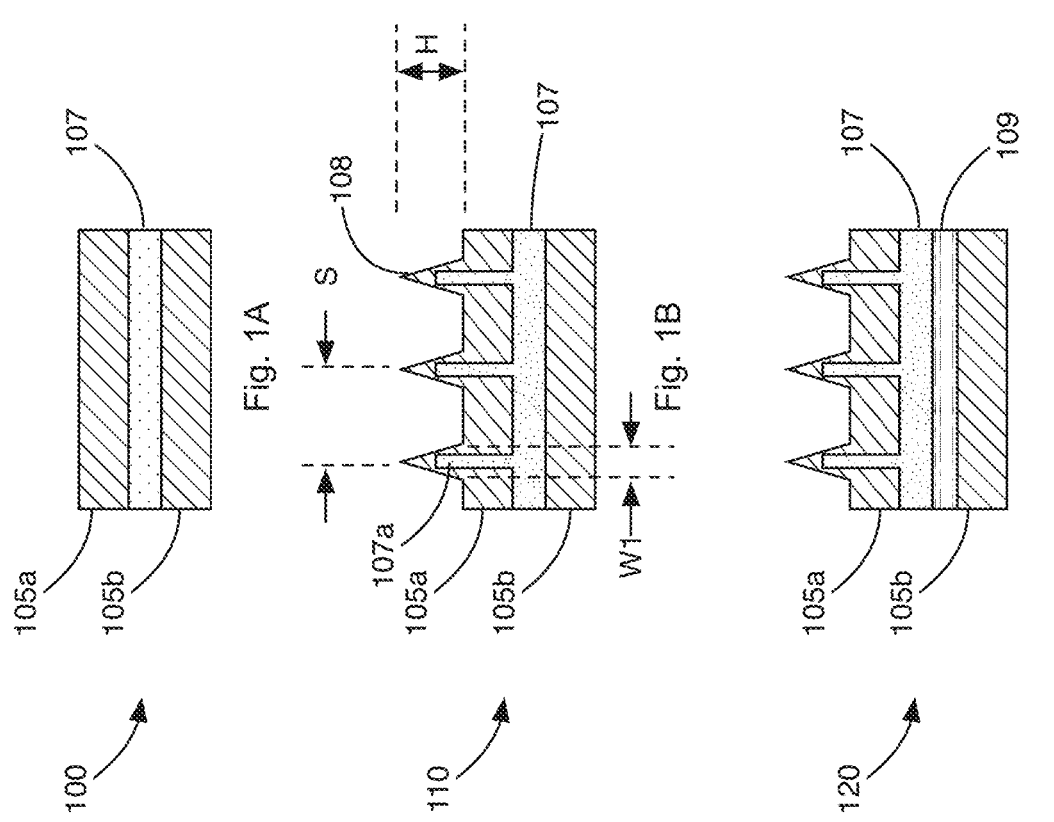

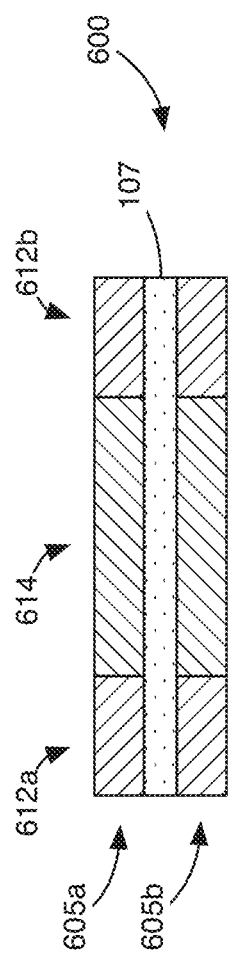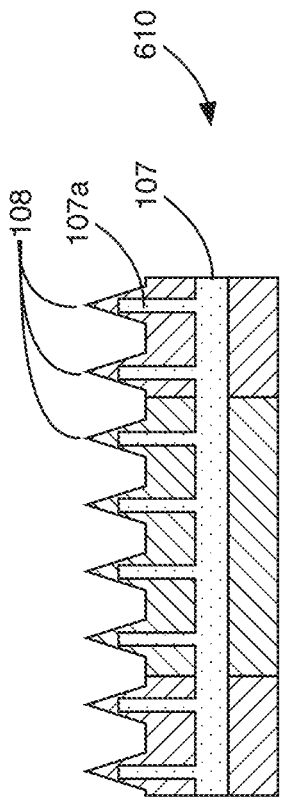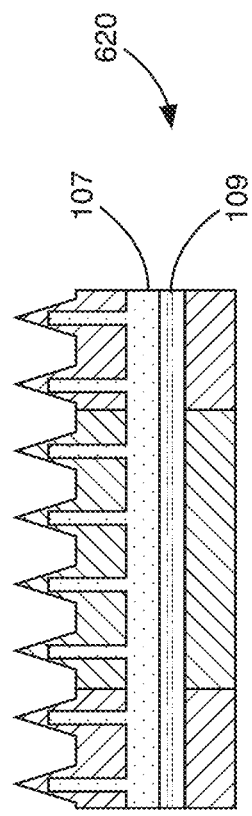

ASSEMBLY AND METHOD FOR SEALING A BUNDLE OF WIRES

BACKGROUND

Field

The present invention relates generally to wire assemblies. More specifically, the present invention relates to an assembly and method for sealing a bundle of wires.

Description of Related Art

Sealing of wire bundles is typically required in applications where large numbers of wires pass through a wall that separates regions having different environmental conditions. For example, in automobiles, wires from various sensors, controllers and the like may pass from the engine compartment, through an opening in the firewall, to a computer located in the cabin. In the region where the wires pass through the opening, the wires may be surrounded by a sealing member. The sealing member is configured to completely encapsulate the wires and ideally fill in voids between the wires to prevent moisture from traveling along the wires into the cabin. The sealing member or members are also configured to provide a watertight fit with the opening in the firewall. The sealant also provides sound dampening, thus reducing the noise level in the passenger compartment.

Some sealing members are formed by surrounding each wire of the bundle or a group of wires of the bundle with a comb or a ring or a sleeve formed from a sealant composite material in the region to be sealed. The sealant composite material may include magnetic flakes. Next, a sleeve with or without the sealant composite material may be placed around the entire bundle in the region to be sealed. Finally, the assembly is subjected to a strong magnetic field that induces local heating in the magnetic material, which in turn causes the sealant to soften and flow and thereby seal the bundle of wires.

However, the method described above has several disadvantages. For example, there is a possibility of overheating due to electromagnetic coupling between the wires and the magnetic field which may occur when the wires are twisted. This may result in wire insulation layer damage. The magnetic flakes of specific composition and configuration may need to be oriented in a particular way when inserted into the sealant, which can increase production time and cost. The requirement that each wire or group of wires (typically two wires) be surrounded by a comb increases the bulk of the sealing member.

Other problems with existing sealing members will become apparent in view of the disclosure below.

SUMMARY

In one aspect, a sealing assembly for sealing a bundle of wires includes a first sheet formed of a sealant material, a second sheet disposed above the first sheet, and a cover to be disposed around the first sheet and the second sheet. The second sheet includes a thermally conductive material. When the bundle of wires is overlaid on the assembly in a first direction, and the assembly is wrapped in a second direction that is generally perpendicular to the first direction to thereby surround the wires, the second sheet facilitates thermal energy distribution of applied heat throughout the assembly to thereby soften the sealant material and thereby lower viscosity of the sealant material to a point at which the sealant material flows and fills voids between the bundle of wires, and the cover maintains the sealant material between the wires.

In a second aspect, an integrated sealing assembly for sealing a bundle of wires includes a lower portion that defines a generally planar shape, a plurality of vertical members extending from the lower portion having a space there between for placement of one or more wires in a first direction, and a thermally conductive material embedded within the lower portion. The integrated sealing assembly is formed from a sealant material. When one or more wires are arranged within the space between the plurality of vertical members in the first direction and the integrated sealing assembly is wrapped in a second direction that is generally perpendicular to the first direction to thereby surround the wires, the thermally conductive material of the integrated sealing assembly facilitates thermal energy distribution of applied heat throughout the assembly to thereby lower a viscosity of the sealant material to a point at which the sealant material of the integrated sealing assembly fills voids between the one or more wires.

In a third aspect, a method for sealing a bundle of wires includes providing a sealing assembly. The sealing assembly includes a first sheet formed of a sealant material, a second sheet disposed above the first sheet, and a third sheet disposed above the second sheet formed of the sealant material. The second sheet includes a thermally conductive material. The bundle of wires is overlaid on the third sheet in a first direction. The sealing assembly and bundle of wires are wrapped together in a second direction that is generally perpendicular to the first direction. Heat is applied to the wrapped assembly. The second sheet facilitates thermal energy distribution of the applied heat throughout the assembly to thereby uniformly melt the sealant material and thereby fill voids between the wires.

BRIEF DESCRIPTION OF THE DRAWINGS

FIG. 1A illustrates a cross-section of a first exemplary sealing assembly embodiment for sealing a bundle of wires.

FIG. 1B illustrates a cross-section of a second exemplary sealing assembly embodiment for sealing a bundle of wires.

FIG. 1C illustrates a cross-section of a third exemplary sealing assembly embodiment for sealing a bundle of wires.

FIG. 6A illustrates a cross-section of a fourth exemplary sealing assembly embodiment for sealing a bundle of wires that includes a different sealant at edge regions.

FIG. 6B illustrates a cross-section of a fifth exemplary sealing assembly embodiment that includes a different sealant at edge regions for sealing a bundle of wires.

FIG. 6C illustrates a cross-section of a sixth exemplary sealing assembly embodiment that includes a different sealant at edge regions for sealing a bundle of wires.

DETAILED DESCRIPTION

Figure 2B:
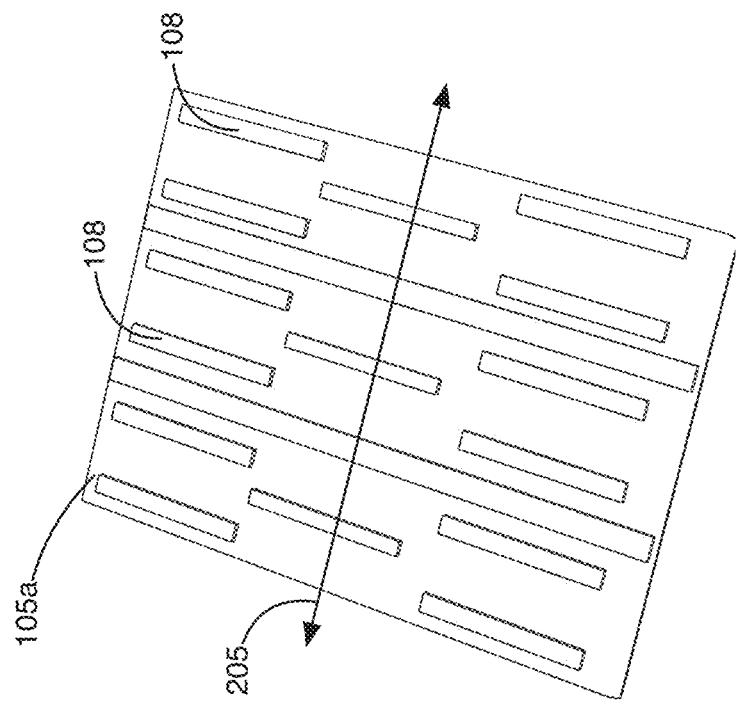
FIGS. 2A and 2B illustrate different exemplary patterns in which teeth may be defined on a top layer of the third exemplary sealing assembly embodiment.

FIG. 1A illustrates a cross-section of an exemplary sealing assembly 100 for sealing a bundle of wires. The sealing assembly 100 includes top and bottom layers 105a,105b or sheets formed from a sealant material. The middle layer 107 or sheet may include a thermally conductive material and a sealant material, which may be the same or different than the sealant material used for forming the top and bottom layers 105a,105b. The thermally conductive material helps to promote more uniform and faster distribution of heat through the sealing assembly 100.

The top, middle and bottom layers 105a, 107, and 105b may be formed from one of several sealant materials described below. In an exemplary implementation, the thickness of the top and bottom layers 105a,105b may be between about 0.5-2 mm. The thickness of the two layers 105a,105b may be the same or different.

The middle layer 107 may include a thermally conductive material embedded within the sealant material from which the middle layer is formed. The middle layer 107 may have a thickness of between about 0.2-2 mm, 0.1-2 mm, 0.01-4 mm, or a different thickness. The thermally conductive structure may correspond, for example, to a metal mesh or metal wool and may have a thickness of between about 0.05-0.4 mm or a different thickness. Other conductive structures may be utilized.

The thermally conductive structure may correspond to a continuous structure that extends in the wrapping/longitudinal direction (205, FIG. 2A) of the sealing assembly 100. In this regard, the thermally conductive structure may have a thermal conductivity range of 50 W/mK or higher. In other embodiments, the thermally conductive structure may correspond to conductive material fragments that are sufficiently close to another to promote more uniform heat distribution.

The wire from which the thermally conductive structure is formed may have a diameter of between about 0.02 and 0.4 mm, and the mesh opening size may be between about 0.1-10 mm. The wire may be formed from copper, aluminum, brass, bronze, steel-based materials, and/or alloys with high thermal conductivity. Other materials having similar thermal conductive characteristics may be utilized. For example, metal foils, formed metal foils, or perforated metal foils may be utilized as the thermally conductive structure. The thermally conductive structure may be coated with a thin electrically insulating material layer, which can provide electrical insulation while being thin enough not to affect the thermal conductivity or the ability to facilitate heat transfer during assembly.

Sealant materials that may be utilized for forming the top, middle and bottom layers 105a, 107, and 105b generally correspond, to a hot melt thermoplastic sealant such as polyolefin based sealant (e.g., the base polymer is polyethylene (PE), metallocene-formed PE, maleic anhydride functionalized PE, or glycidyl methacrylate functionalized PE), polyolefin copolymer based sealant (e.g., the base polymer is ethylene-vinyl acetate copolymer (EVA)), a polyamide-based sealant, a thermoplastic elastomer (TPE) based sealant, a polyolefin and polyamide (PA) mixture based sealant, a polyolefin and polyolefin copolymer mixture based sealant (e.g., PE:EVA in weight ratios 95:5, 90:10, 75:25, or 50:50), a polyolefin copolymer and polyamide mixture based sealant (e.g., EVA:PA in weight ratios 95:5, 90:10, 75:25, or 50:50). A different sealant or sealant mixture with similar characteristics may be utilized.

For example, a first sealant material for forming the top, middle and bottom layers 105a, 107, and 105b may be characterized by the following parameters:

| | |
|---|---|
| Viscosity (V) | >1000 Pa s at ≤100° C. |
| | >300 Pa s (preferably >1000 Pa s) at ≤105° C. |
| | <100 Pa s at ≥110° C. |
| Softening temperature | About 100-110° C. |
| Hardness, Shore D | <60 (preferably ≤30) |

A second sealant material for forming the top, middle and bottom layers 105a, 107, and 105b may be characterized by the following parameters:

| | |
|---|---|
| Viscosity | >1000 Pa s at ≤100° C. |
| | >300 Pa s (preferably >1000 Pa s) at ≤120° C. |
| | <100 Pa s at ≥125° C. |
| Softening temperature | About 100-120° C. |
| Hardness, Shore D | <60 (preferably ≤30 |

The viscosity of the first and second sealant materials as well as the viscosity of the sealant materials described below was measured using a rotation rheometer. In this method, a small disk of sealant material (e.g., 1.5 mm-1.8 mm thick, 25 mm diameter disk) is placed between plates of the rotation rheometer and sheared (oscillatory mode) by means of a rotational motion frequency of 6.28 rad/sec. The temperature of the sealant material is gradually increased from 60° C. to 140° C. at a rate of 5° C./min and the complex viscosity is measured as a function of temperature. The softening temperature referred to herein was the Ring and Ball softening temperature as measured according to ASTM E28.

A third sealant material for forming the top, middle and bottom layers 105a, 107, and 105b may include a crosslinking agent to cause the sealant to undergo a change in viscosity characteristics when heated to a curing temperature. When subjected to an elevated temperature (e.g., at or above the softening temperature) for a time sufficient to allow the polymers in the sealant crosslink (e.g., one to ten minutes) the viscosity of the sealant increases. This results in a sealing assembly that can withstand higher temperatures, such as those temperatures that may be present in an automotive engine compartment.

The third sealant material may include low molecular weight polymers (e.g., wax); a crosslinking agent (e.g., a peroxide, silanes), crosslinking promoting additives (co-agents, e.g., triallyl isocyanurate (TAIL), triallyl cyanurate (TAC), trimethylolpropane triacrylate (TMPTA), trimethylolpropane trimethacrylate (TMPTMA)), a polyolefin/polyamide/polyolefin copolymer (e.g., EVA) and other fillers or additives, such as carbon black, antioxidants, stabilizers, tackifiers, etc. The sealant may contain 50-90 weight % (wt %) base polymer, 0-43 wt % low molecular weight polymer, 2-8 wt % peroxide, 1-10 wt % co-agent, and 0-5 wt % of other additives.

The resultant sealant may be characterized by the following parameters:

| Viscosity (V) | <1000 Pa · s at ≤70° C. |
| | <100 Pa · s at 70° C. ≤ T ≤ 110° C. before curing |
| | >1000 Pa · s at ≥110° C. after curing |
| | >1000 Pa · s at ≤110° C. after curing |
| Softening temperature | About 60-80° C. |
| Hardness, Shore D | <60 (preferably ≤30) |

In some implementations a different sealant may be utilized for forming the middle layer 107. For example, a fourth sealant, which may be utilized to form the middle layer 107, may be characterized by the following parameters:

| Viscosity (V) | >1000 Pa s at ≤100° C. |
| | >300 Pa s (preferably >1000 Pa s) at ≤105° C. |
| | <100 Pa s at ≥110° C. |
| Softening temperature | About 105-120° C. |
| Hardness, Shore D | <60 (preferably ≤30) |

Various materials may be added to any the sealants described above to improve the sealing characteristics. For example, the sealants may include filler materials to improve thermal conductivity without compromising the viscosity characteristics listed above. The filler materials may correspond to carbon, copper, nickel, aluminum, stainless steel, copper containing alloys, a copper-tin mixture, boron nitride, aluminum nitride, aluminum oxide, silicon carbide, beryllium oxide, silicon nitride, magnesium oxide, and/or other fillers In some implementations, the sealants may include stabilizer materials to improve longtime temperature aging characteristics. For example, the sealant materials may have 0.2-2 wt % antioxidants (e.g., sterically hindered phenolic antioxidants) and/or secondary antioxidants (e.g., thioesters, lauryl/stearyl thiopropionate). Tackifiers may be added at 0.2-20 wt % to improve adhesion.

In some implementations, physical or chemical foaming agents may be added to the sealants to improve the flow behavior and to reduce the sealant material usage.

FIG. 1B illustrates a cross-section of a second exemplary sealing assembly 110 for sealing a bundle of wires. The second exemplary sealing assembly 110 corresponds to the first sealing assembly embodiment with the addition of teeth 108 or ridges formed on the top layer 105a. The teeth 108 may be formed with the sealant used for forming the top layer 105a.

In some implementations, the conductive material in the middle layer 107 may extend through the top layer 105a and into the teeth 108. The teeth 108 help promote sealing between the wires by melting and flowing in between wires. In addition, the teeth 108 serve as guides that facilitate more uniform placement of wires on top of the assembly.

Figure 2A:
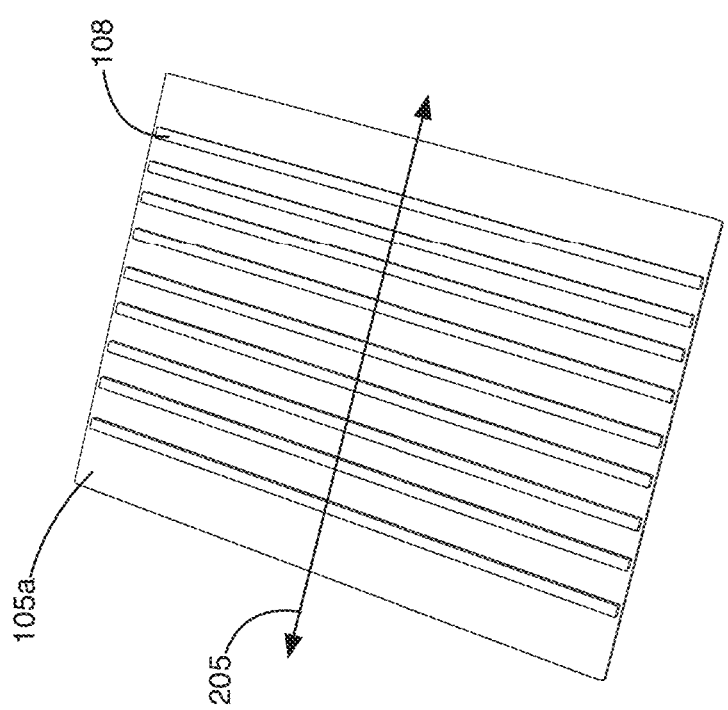

The teeth 108 may run perpendicular to the wrapping/longitudinal direction 205 of the sealing assembly 110 as illustrated in FIGS. 2A and 2B. FIGS. 2A and 2B illustrate different exemplary patterns in which the teeth 108 may be arranged on the top layer 105a. As illustrated in FIG. 2A, the teeth 108 may extend from one edge of the assembly 110 to the opposite edge. As illustrated in FIG. 2B, some teeth may be shorter than other teeth. Other arrangements of the teeth 108 may be utilized as circumstances require.

In an exemplary implementation, the teeth 108 may have a width, W1, of between about 0.25-5 mm and a height, H, of between about 1-10 mm. The teeth 108 may be spaced apart from one another by a distance, S, of between about 2-50 mm. The shape of the teeth may vary. For example, as illustrated in FIG. 1C, the teeth may have a triangular shape in cross-section. However, the teeth may have a rectangular cross-section or a different cross-section.

FIG. 1C illustrates a cross-section of a third exemplary sealing assembly 120 for sealing a bundle of wires. The third exemplary sealing assembly 120 corresponds to the second sealing assembly embodiment with the addition of a heat shrinkable material layer 109. In an third exemplary sealing assembly 120, the thickness of the heat-shrinkable material layer 109 may be between about 0.1-1 mm.

The heat-shrinkable material layer 109 may be formed from materials such as crosslinked polyolefin (e.g. polyethylene copolymer) or fluoropolymer (e.g. ethylene-tetrafluoroethylene copolymer (ETFE) or non-crosslinked materials (e.g., polyethylene terephthalate (PET)) with or without sealants (e.g. sealants in which the polymer base material is polyamide or a polyethylene copolymer such as ethylene-vinyl acetate copolymer (EVA)). Commercial heat-shrink tapes may be utilized. The material from which the heat-shrinkable material layer 109 is formed may have a shrinkage of 5-50% between 105° C.-150° C. The layer 109 shown in FIGS. 1C and 6C may be positioned adjacent to layer 105b (in FIG. 1C) or adjacent to layer 605b (in FIG. 6C).

Figure 3A:
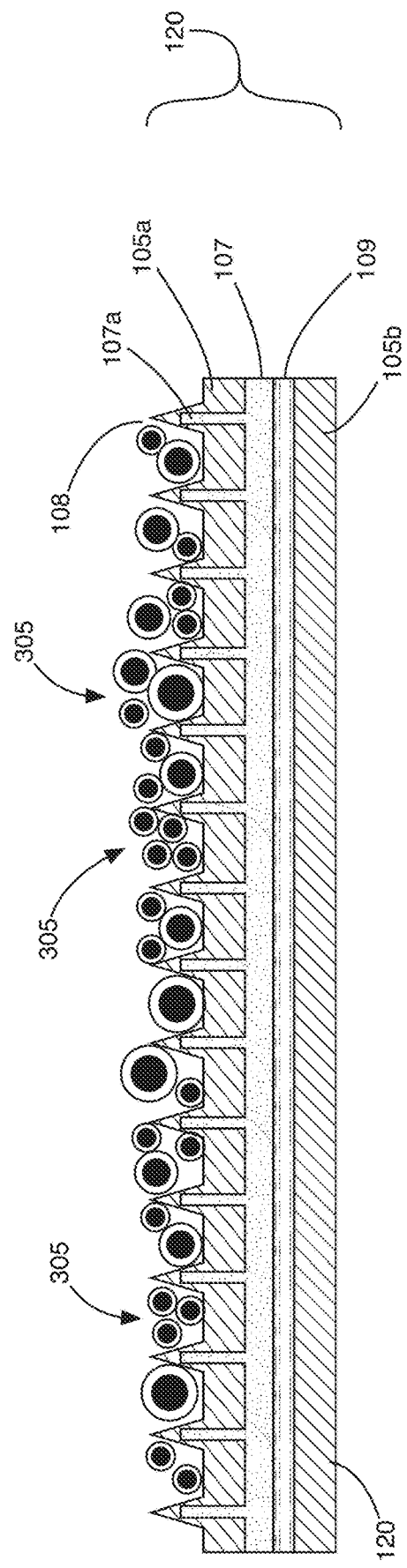
FIG. 3A illustrates the placement of wires on the third exemplary sealing assembly embodiment.
Figure 3B:
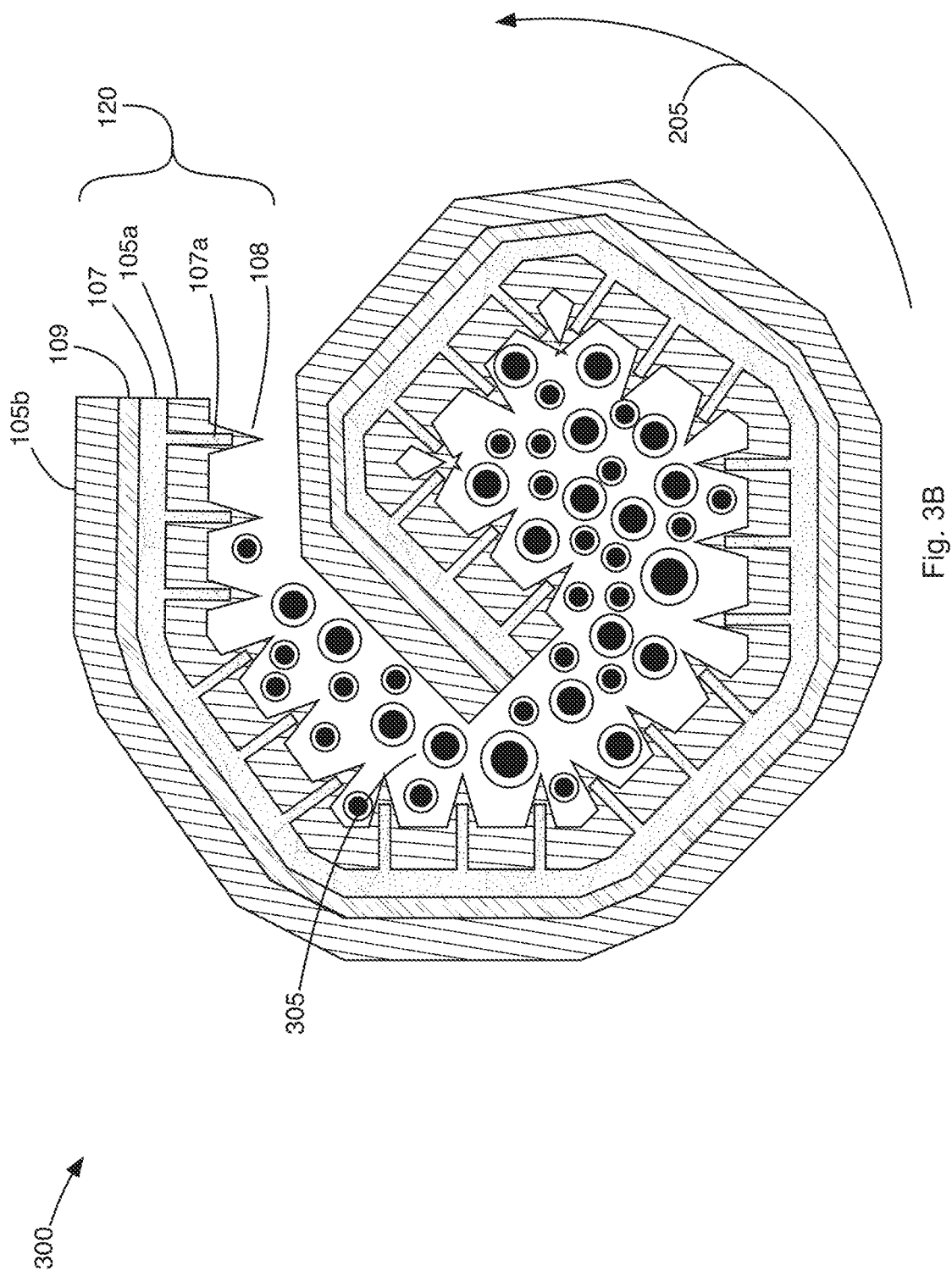
FIG. 3B illustrates spirally rolling the third exemplary sealing assembly embodiment and wires of FIG. 3A.
Figure 3C:
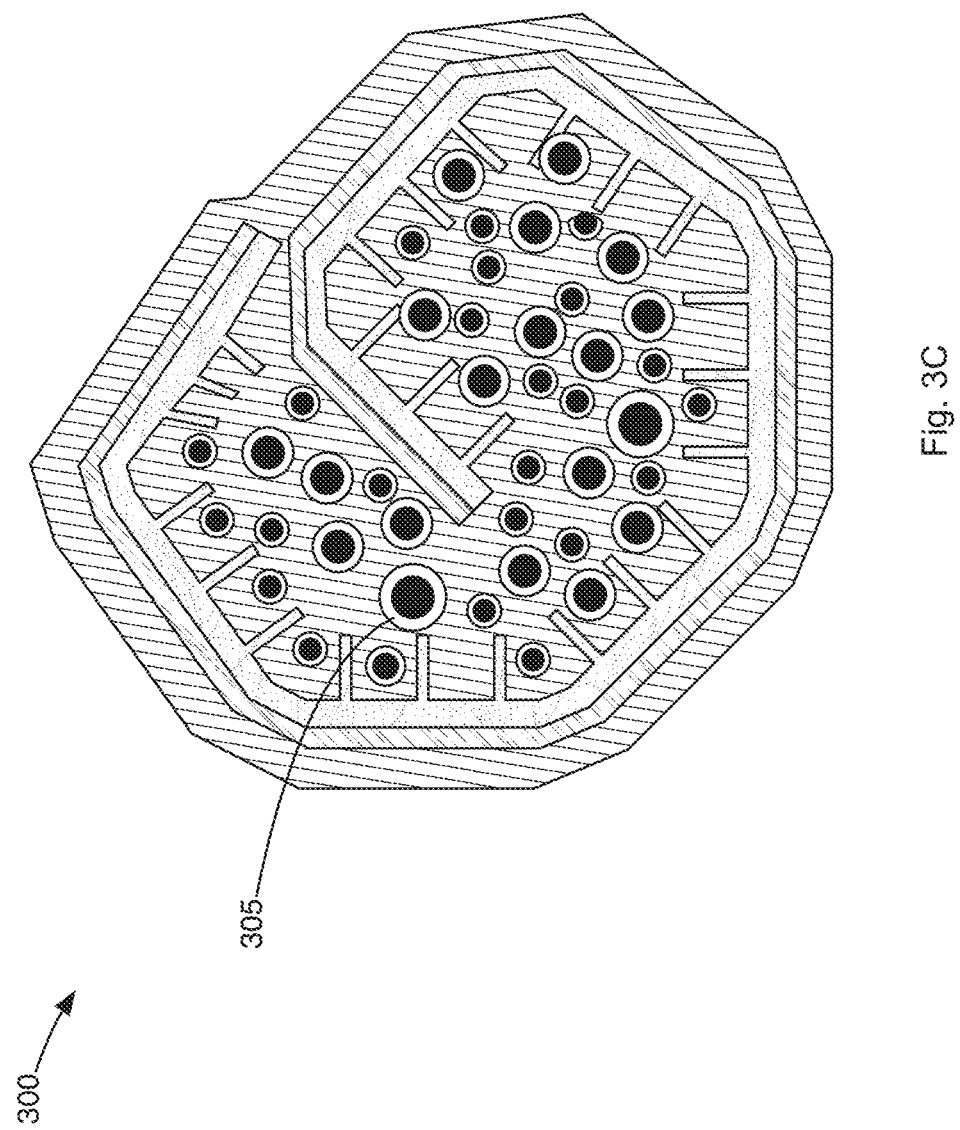
FIG. 3C illustrates sealant material filling in voids between the wires after the assembly is heated.

FIGS. 3A-3C help illustrate an exemplary methodology by which the third exemplary sealing assembly 120 may be utilized to seal a bundle of wires 305. It should be understood that the methodology may be applied to the other assemblies.

As illustrated in FIG. 3A, in one implementation, the assembly 120 may be provided in a generally flat form. Wires 305 may then be placed upon the assembly 120. At this stage, the teeth 108 may act as guides to facilitate even distribution of the wires 305 over the top layer 105a of the assembly 120. For example, the number of wires 305 placed within the valleys defined between the teeth 108 may be selected so that the wires do not spill over into adjacent valleys. In addition, the teeth 108 help ensure that the wires cross over the assembly in a direction that is transverse to the direction in which the assembly will be wrapped or rolled.

As illustrated in FIG. 3B, the assembly 120 and wires 305 may be rolled or wrapped in a longitudinal direction 205 within the assembly 120 so that the assembly 120 covers all the wires. For example, the sealing assembly 120 and wires 305 may be spirally rolled in a spiral direction 205 so that the assembly 120 covers all the wires 305. Heat may then be applied to the spirally rolled sealing assembly and wires 300. For example, the spirally rolled assembly and wires 300 may be heated in an oven, via a heat gun, and/or via some other heating system to a temperature of between about 105-160° C. (as measured inside the assembly) for between about 1-10 minutes to obtain sealing. In this regard, the thermally conductive material within the middle layer 107 helps to promote more uniform and faster distribution of heat energy throughout the spirally rolled assembly sealing assembly and wires 300 by conducting heat energy from the outer area of the spirally rolled assembly and wires 300 to the interior of the spirally rolled assembly and wires 300.

As illustrated in FIG. 3C, the top and bottom layers 105a,105b of sealant material may melt together and fill voids between the wires 305 thereby sealing the wires 305.

When included in the embodiment, the heat-shrinkable material layer 109 forces the spirally rolled assembly and wires 300 to shrink in a radial direction. This in turn helps to squeeze the melted, or in some embodiments, softened sealant material into the voids.

Figure 3E:
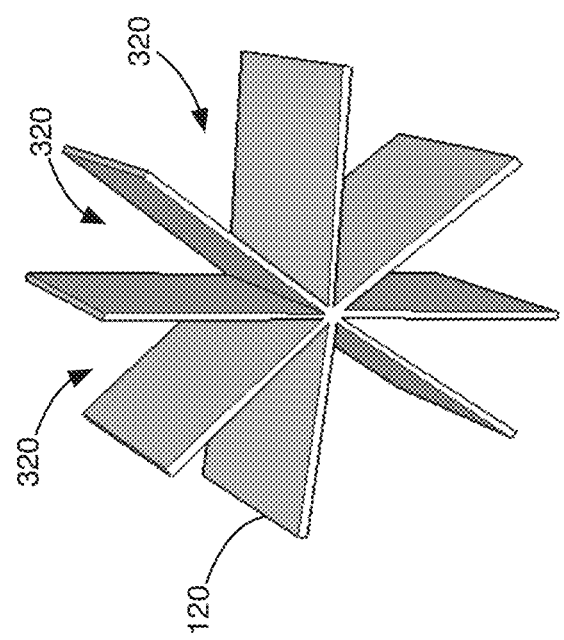
FIGS. 3D and 3E illustrate different exemplary configurations of the sealing assembly.
Figure 3D:
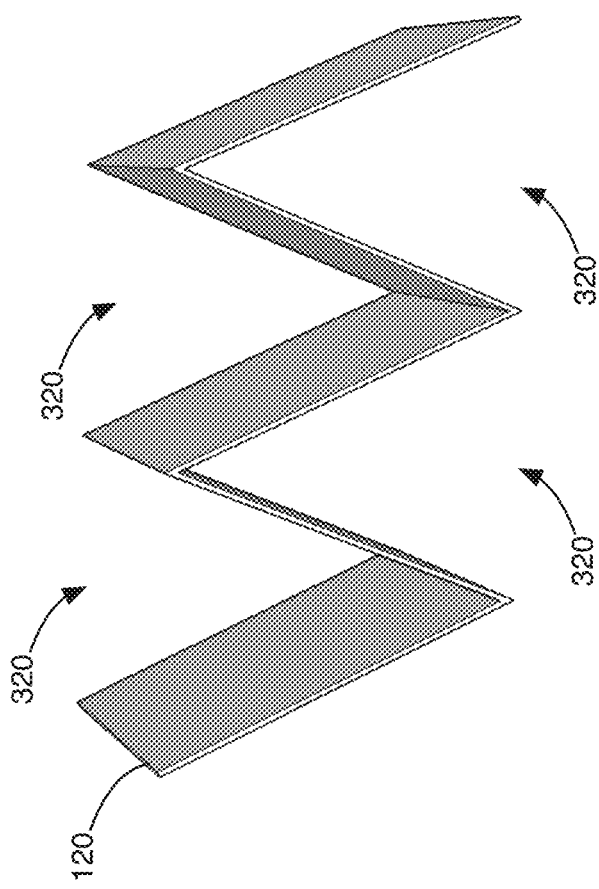

In an alternative implementation, the assembly 120 may be folded into the shape illustrated in FIG. 3D or the shape illustrated in FIG. 3E. The wires 305 may then be placed within folds 320 of the folded assembly. The folded assembly may then be compressed so that the assembly is in tight contact with the wires and then heated to seal the bundle of wires.

It should be understood that the assembly 120 may be folded into different shapes. In addition, the illustrated shape may be obtained by methods other than folding. For example, the assembly 120 may be extruded from a die or be molded or overmolded from a mold, etc., and form a variety of shapes.

Figure 3F:
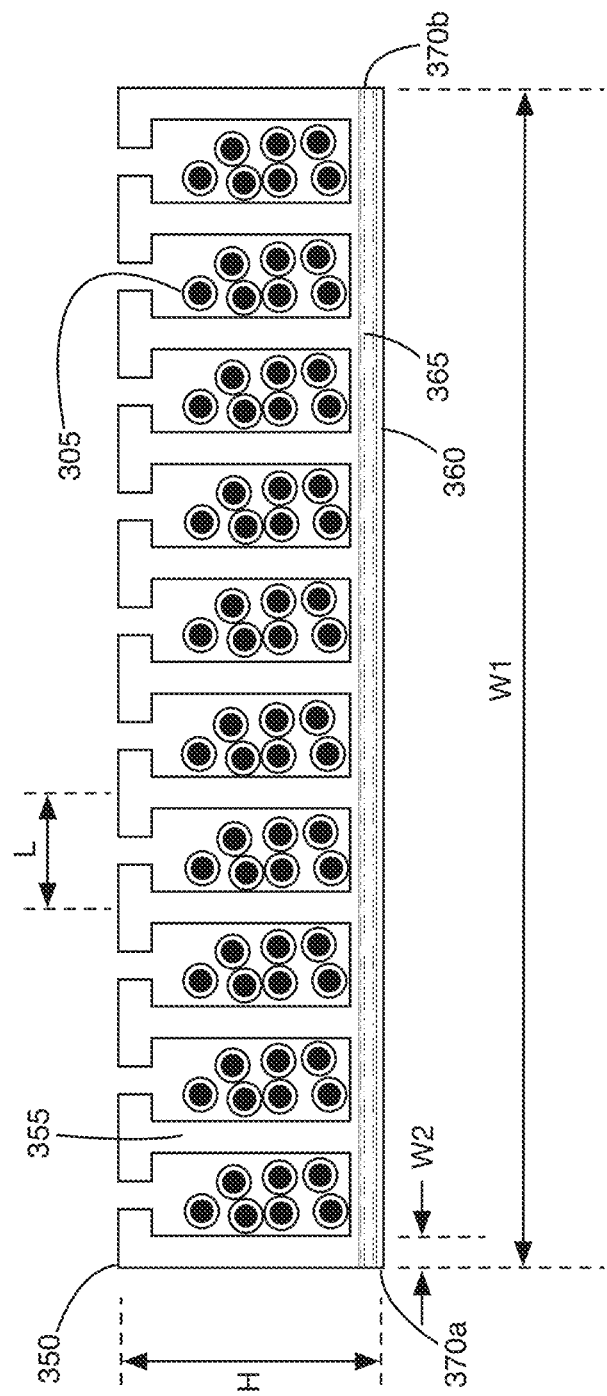
FIG. 3F illustrates a sealing assembly that defines a comb-like structure that may be utilized to seal a bundle of wires 305.

FIG. 3F illustrates yet another embodiment of a sealing assembly 350 that may be utilized to seal a bundle of wires 305. The sealing assembly 350 may be formed using any of the sealants described herein via a molding technique such as extrusion from a die, molded or overmolded from a mold, etc.

As illustrated, the sealing assembly 350 may define a comb-like structure. For example, the sealing assembly 350 may include a lower portion 360 and a plurality of vertical members 355 or teeth extending from the lower portion 360 between which wires 305 may be inserted. The lower portion 360 may have a generally planar shape with a width, W1, of about 50 mm-1000 mm. A depth of the lower portion 360 (i.e., the distance into the drawing and not shown) may be about 0.5-50 mm, 5-14 mm, 10-25 mm. The vertical members 355 may extend from the lower portion 360 to form a 90° angle with the lower portion 360, or may be at any other convenient angle for insertion of wires 305.

The vertical members 355 may have a width, W2, of about 0.1-3 mm, a height, H, of about 0.5-25 mm, and may be spaced apart by a distance, L, of about 1-50 mm. The vertical members 355 may be spaced evenly between first and second ends 370a,370b of the lower portion 360 or may be spaced differently.

In one implementation, a conductive material 365 may be embedded in the lower portion 360 of the sealing assembly 350. While not illustrated, in other implementations, the conductive material may be embedded in the vertical members 355 as well.

The conductive material 365 may correspond to any of the conductive materials described herein. The conductive material 365 may extend continuously between, for example, the first and second ends 370a,370b of the lower portion 360, as illustrated, or discontinuously. For example, conductive material fragments that may or may not make direct contact with one another may be dispersed in the lower portion 360 or vertical members 355. In this regard, a distance between the conductive material fragments may be as much as 0.5 mm.

As described above, the conductive material 365 facilitates improved heat distribution throughout the assembly 350. This in turn facilitates improved softening or melting of the sealant from which the assembly 350 is formed.

Similar to the other implementations, the wires 305 may be inserted between the vertical members 355. The assembly 350 and wires 305 may then be wrapped or rolled and then inserted within, for example, a heat shrinkable tube. Heat may then be applied to cause the sealant to soften or melt and the heat shrinkable tube to compress the sealant so that the sealant fills the voids between the wires 305.

Figure 4B:
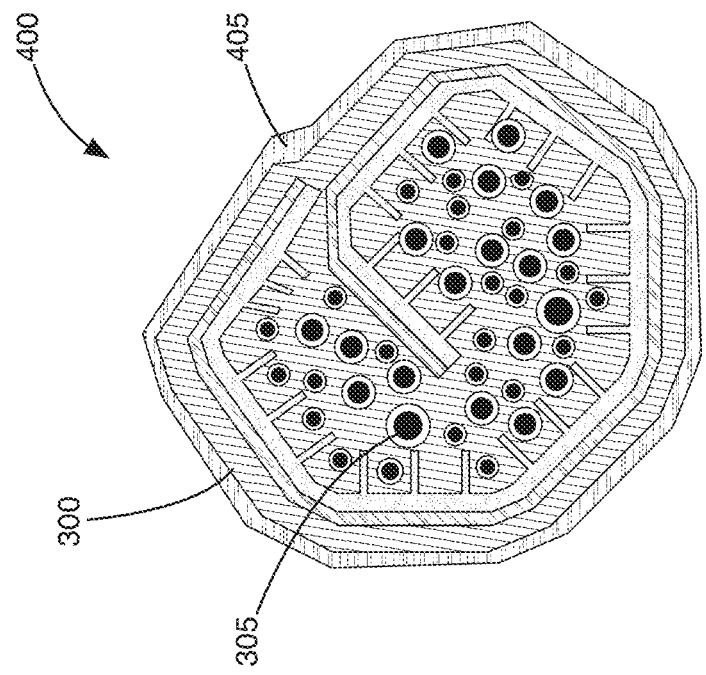
FIGS. 4A-4B illustrate placement of a heat-shrinkable sleeve over the sealing assembly and wires.
Figure 4A:
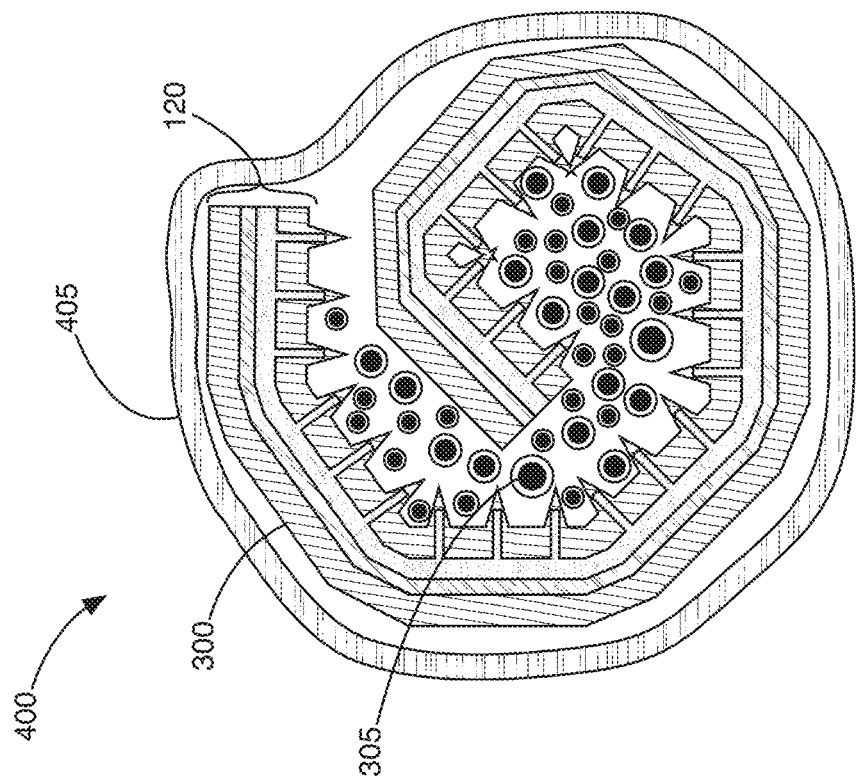

In some implementations, an article, such as a heat-shrinkable article, an expanded rubber cover, a grommet or a different cover may be placed over the sealing assembly and wires prior to or during heating to apply constricting force to the sealing assembly and wires to promote flow of the sealant during heating. For example, FIG. 4A illustrates a heat-shrinkable article 405 placed around the spirally rolled sealing assembly and wires 300 illustrated in FIG. 3B. FIG. 4B illustrates shrinkage of the heat-shrinkable article 405 around the spirally rolled sealing assembly and wires 300. The heat-shrinkable article 405 applies additional constricting force to the spirally rolled sealing assembly and wires 300 to help ensure that the sealant material flows into the voids.

Figure 4D:
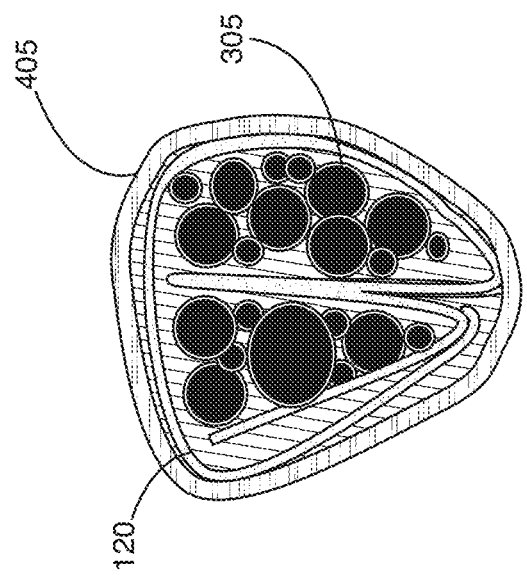
FIGS. 4C-4D illustrate placement of a heat-shrinkable sleeve over the sealing assembly and wires.
Figure 4C:
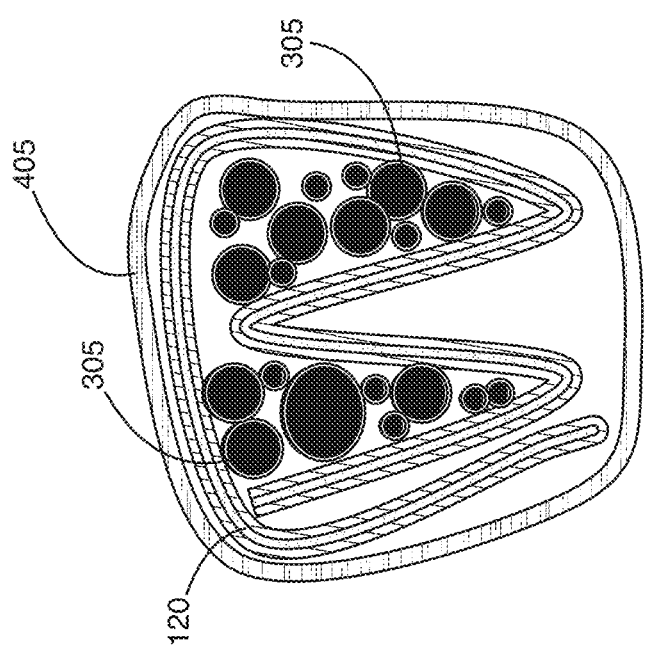

Similarly, FIG. 4C illustrates the sealing assembly 120 when folded into the configuration illustrated in FIG. 3D, with a heat-shrinkable article 405 placed over the sealing assembly 120, and wires 305 inserted therein prior to heating. FIG. 4D illustrates shrinkage of the heat-shrinkable article 405 around the assembly 120 and wires 300.

Heat recoverable (especially heat shrinkable) articles, for example tubes, "boots", "udders", sleeves, wrap-around sheets, tapes and moldings. The heat-shrinkable article 405 may correspond to a commercial single or double layer heat-shrinkable sleeve tube such as RNF-100 or ATUM tubing sold by Tyco Electronics Corporation. The heat-shrinkable article 405 may include sealants such as a polyamide sealant, EVA sealant, etc. Carbon, copper-tin, and/or other materials may be included to improve the thermal conductivity of the heat-shrinkable article 405.

The wall thickness of the heat-shrinkable article 405 (or in the case of a heat-shrinkable tape, a thickness of the heat-shrinkable tape) before shrinking may be between about 0.5-2 mm. The heat-shrinkable article 405 may have a shrink ratio of 4:1, 3:1, 2:1, 1.5:1, or a different shrink ratio. The shrink temperature may be between about 80-150° C.

Figure 5:
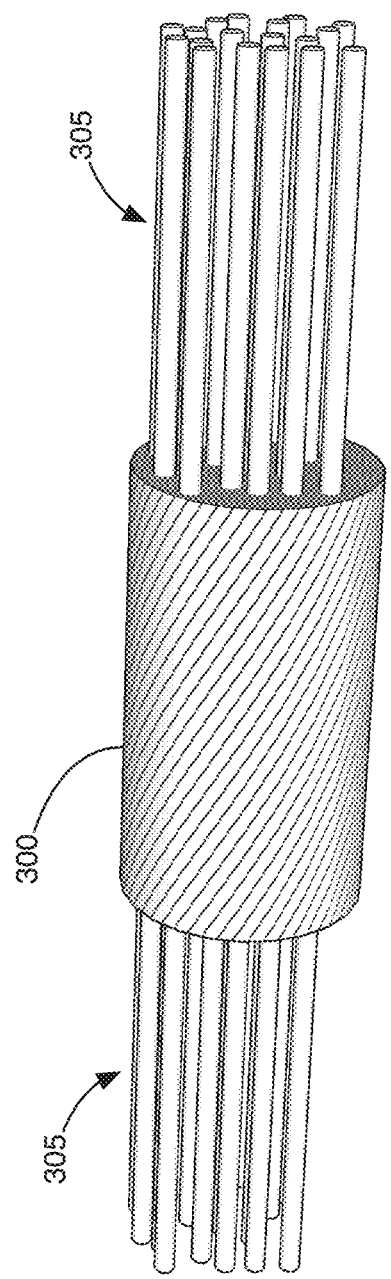
FIG. 5 illustrates the assembly in final form.

FIG. 5 illustrates the assembly 300 or the assembly 400 with the heat-shrinkable sleeve 405 in final form. As shown, the wires 305 may extend from opposite ends of the assembly 300/400. The sealed assembly 300/400 may then be utilized for its intended application. For example, in an automotive environment, the sealed assembly 300/400 facilitates running wires from the engine compartment through the firewall and into the cabin of the vehicle. The sealed assembly 300/400 may be snuggly fitted into an opening in the firewall, thereby preventing the ingress of water into the cabin of the vehicle from the engine compartment. For example, if a grommet is not already being used as a cover for the assembly, the sealed assembly 300/400 may be inserted into a grommet and the grommet and sealed assembly 300/400 may be positioned within the opening.

FIGS. 6A-6C illustrate fourth, fifth, and sixth sealing assembly embodiments 600, 610, and 620 that respectively include the features of the first, second, and third embodiments 100, 110, and 120 presented in FIGS. 1A-1C, respectively. The difference between the respective embodiments is that the sealant utilized for forming edge regions 612a, 612b of the top and bottom layers 605a,605b of the fourth, fifth, and sixth sealing assembly embodiments 600, 610, and 620, is different from a sealant material used for forming the middle region 614. The sealant material or materials utilized in the middle region 614 may correspond to one or more of the first, second, third sealant materials for forming the top and bottom layers 105a,105b of the first, second, and third embodiments 100, 110, and 120, as described above. The sealant material for the edge regions 612a,612b may be selected to help slow or prevent, i.e. inhibit, the sealant in the middle region 614 from melting/pouring out of the assembly 600, 610, and 620 when heated.

The sealant of the edge regions 612a,612b may have a thickness between about 0.5-2 mm and be characterized by the following parameters:

| | |
|---|---|
| Viscosity (V) | >1000 Pa s at ≤100° C. |
| | >300 Pa s (preferably >1000 Pa s) at ≤105° C. |
| | >500 Pa s (preferably >1000 Pa s) at ≥110° C. |
| Softening temperature | About 110-120° C. |
| Hardness, Shore D | <60 (preferably ≤30) |

Like the sealants described earlier, the sealant at the edge regions 612a, 612b may include filler and stabilizer materials to improve thermal conductivity without compromising the viscosity characteristics listed above and to improve longtime temperature aging characteristics, respectively.

Figure 7:
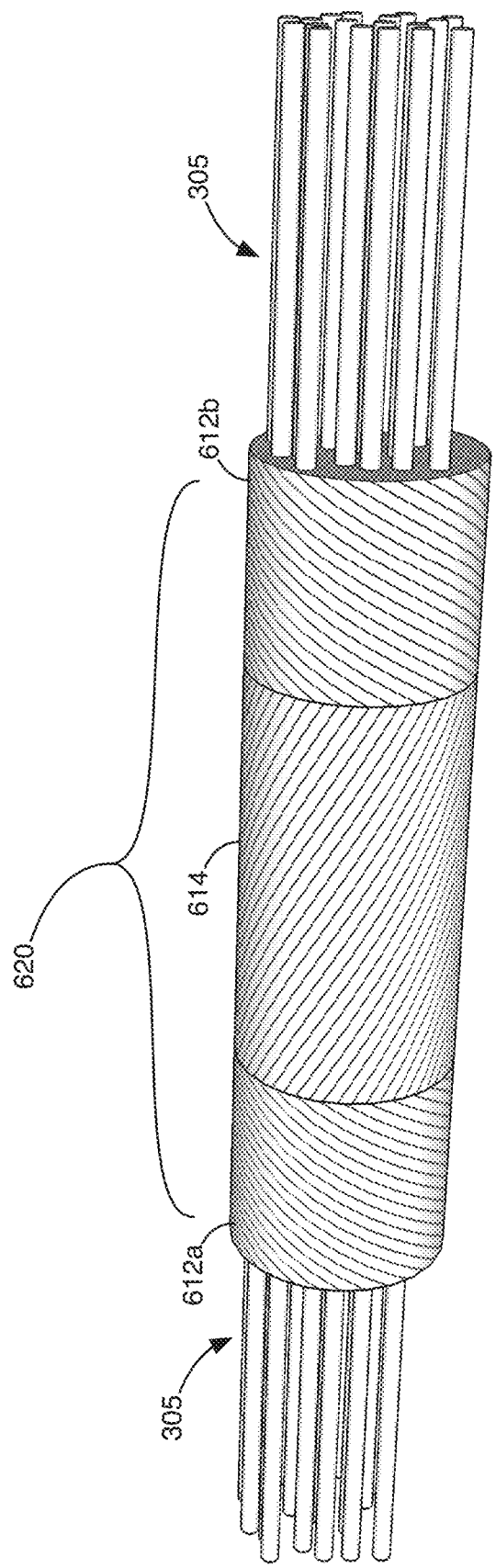
FIG. 7 illustrates the assembly embodiment of FIG. 6C in final form.

FIG. 7 illustrates the assembly embodiment 620 illustrated in FIG. 6C in final form. As described above, wires 305 may extend from opposite ends of the assembly 620. The sealed assembly 620 may then be utilized for its intended application such as facilitating running wires from an engine compartment through a firewall and into the cabin of a vehicle, as described above.

Figure 8:
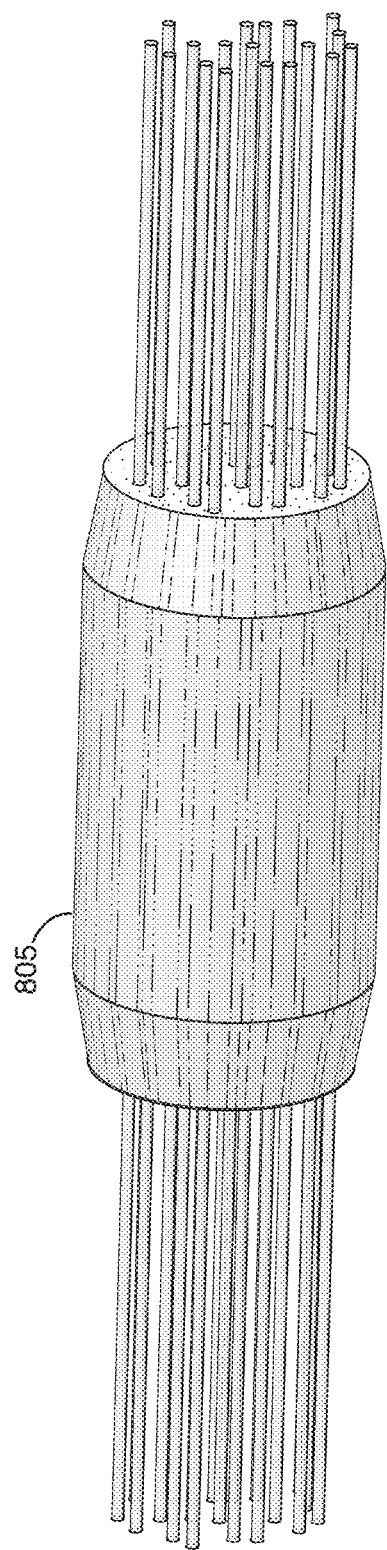
FIG. 8 illustrates placement of a heat-shrinkable sleeve over the assembly of FIG. 7.

As is the case for the first, second, and third assembly embodiments 100, 110, and 120, a heat-shrinkable sleeve 805 or similar device that can apply a constricting force may be provided over the fourth, fifth, and sixth assembly embodiments 600, 610, and 620, as illustrated in FIG. 8. The heat-shrinkable sleeve 805 helps to further squeeze the melted or softened sealant material into the voids between the wires 305.

Figure 9:
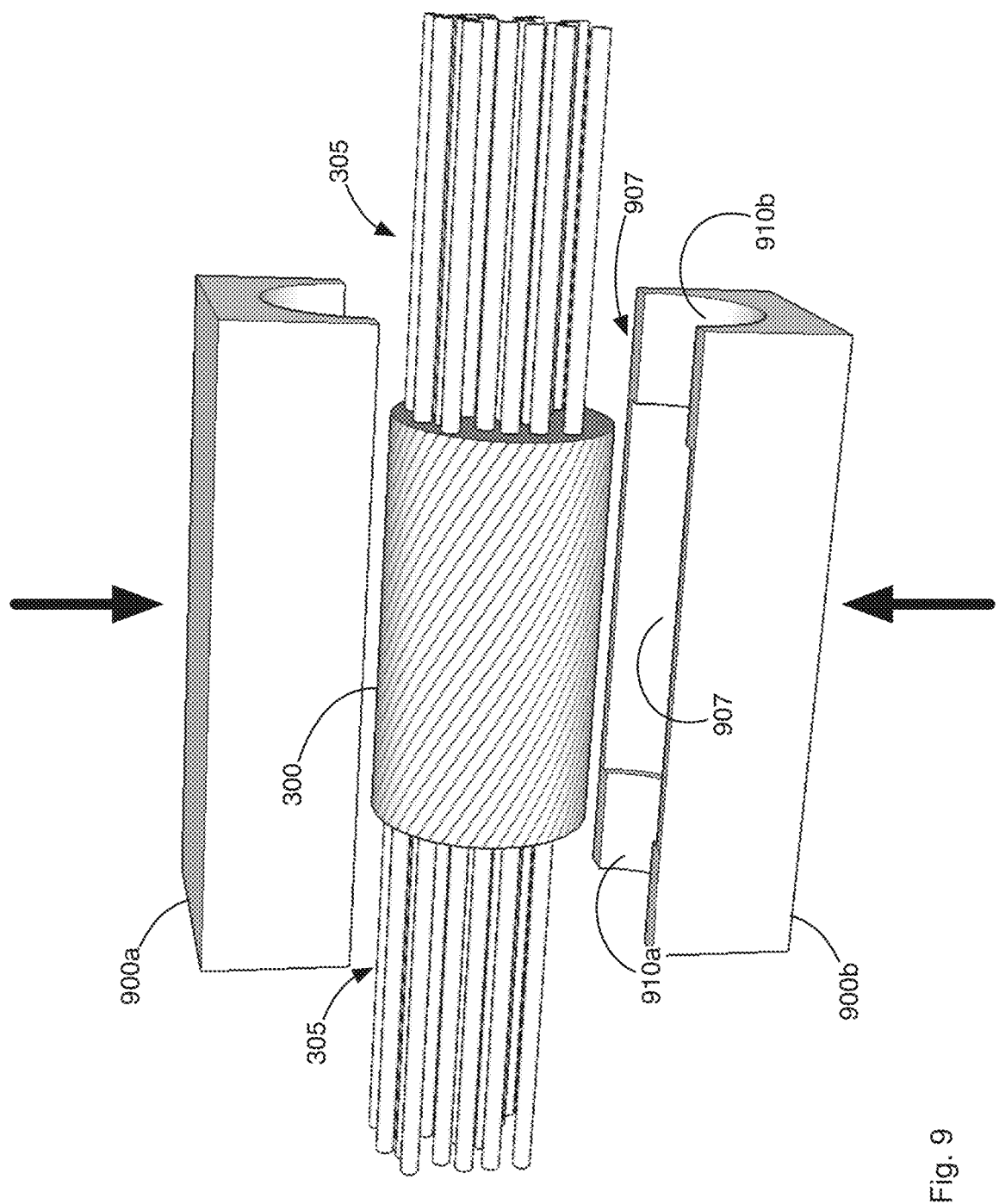
FIG. 9 illustrates a compression operation for compressing the assembly of FIG. 5.

FIG. 9 illustrates an exemplary compression operation that may be applied to any of the assemblies described above to improve the sealing characteristics of the assembly. Illustrated are the assembly of FIG. 5 and a pair of compression plates 900a,900b that may correspond to parts of a press, where the plates 900a,900b may be pressed against the assembly prior to or just after applying heat to the assembly 300. The plates may define a generally cylindrical cavity 907 that defines the final/cured shape of the assembly. The amount of force is selected based on the viscosity of the sealant.

In some implementations, the plates 900a,900b may include end regions 910a,900b that extend passed the sealing assembly 300 and over a portion of the wires extending from the sealing assembly 300. The diameter of the cylindrical cavity 905 at end regions 910a,900b may be reduced in comparison to the diameter of the center region 907 of the cylindrical cavity 907 to help prevent, i.e. inhibit, the sealant from spilling out through the ends of the assembly 300 during heating and compression.

One advantage of this implementation is that higher viscosity sealants may be utilized, such as sealants having a viscosity of more than 20 Pa·s at a temperature of great than 100° C., which could effectively seal 100 wires or more with an applied pressure of about 1000 kPa. Such sealants are less likely to spill out of the ends of the assembly. However, the sealants might not be capable of flowing between all the wires of the assembly without application of pressure. Thus, this implementation overcomes that problem.

In some implementations, heat may be conveyed to the assembly via the compression plates 900a,900b. This may facilitate more uniform heating of the assembly 300.

While pressure is illustrated as being applied by a pair of plates 900a,900b, the pressure may be applied differently. For example, a different number of plates may be provided. A deflated bladder may be wrapped around the assembly, secured, and then inflated to compress the assembly 300. The plates may be urged together via resilient members (i.e., compression springs) that connect the plates together. Other methods may be utilized.

As noted earlier, the middle layer 107 may include a thermally conductive material to promote distribution of heat energy throughout the assembly. In addition, or alternatively, in some implementations infrared (IR) heating or inductive heating may be utilized to heat the assembly.

Regarding IR heating, in some implementations, an IR absorbing material may be added to the sealant. For example, 0.05-0.5 wt % carbon black may be added to the any of the sealants described above. The IR absorbing material converts the IR energy to heat, which in turn lowers the viscosity of the surrounding sealant, causing the sealant to fill in the voids between the wires. As noted earlier, in some implementations a heat-shrinkable sleeve 405 may be placed over the assembly 300 prior to heating the assembly, as illustrated in the assembly 400 of FIGS. 4A and 4B. To facilitate IR heating in this case, a transparent or semitransparent heat-shrinkable sleeve 405 may be utilized to allow the IR energy to passes through the heat-shrinkable sleeve 405 and to the IR absorbing material distributed throughout the assembly 400.

Similarly, in cases where a press is utilized to compress the assembly, the compression plates 900a,900b may be formed from a transparent or semitransparent material to facilitate passage of IR energy.

To facilitate inductive heating, a ferromagnetic material may be added to the sealant. For example, nickel, nickel aluminum alloys, nickel chromium alloys, ferrites, and/or a different a ferromagnetic material may be added to any of the sealants described above. Generation of a relatively low power magnetic field (e.g., <10 W) may be sufficient to heat the sealant without damaging wire insulation.

While the method for manufacturing the sealing assembly has been described with reference to certain embodiments, it will be understood by those skilled in the art that various changes may be made and equivalents may be substituted without departing from the spirit and scope of the claims of the application. For example, in some or all of the sealing assemblies described above, the respective assemblies and or wires arranged therein may be twisted or turned while being heated further improving the distribution of the sealant material into the voids between the wires.

In implementations that include a uniform conductive material, the conductive material may extend outside of the sealant to facilitate running electrical current through the conductive material. This in turn may result in resistance heating of the conductive material, which in turn will heat and therefore melt or soften the sealant material. The presence of a thermally conductive material may assist in the transfer of heat into the conductive material by means of conduction or convection.

Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

We claim:

1. A sealing assembly for sealing a bundle of wires comprises:
    a first sheet formed of a meltable sealant material;
    a second sheet disposed above the first sheet, the second sheet formed of a second sealant material and includes a thermally conductive material;
    a third sheet disposed above the second sheet formed of the sealant material wherein the third sheet defines a plurality of teeth on a top surface that define valleys there between for controlled placement of one or more wires of the bundles of wires wherein the thermally conductive material extends from the second sheet into at least some portions of the plurality of teeth; and
    a cover that can be disposed around, wherein when the bundle of wires is overlaid in a first direction on the assembly, the assembly is wrapped in a second direction that is generally perpendicular to the first direction to thereby surround the wires, and the cover is disposed around the wrapped assembly and the bundle of wires,
    the second sheet facilitates thermal energy distribution of applied heat throughout the assembly to thereby lower a viscosity of the meltable sealant material to a point at which the meltable sealant material melts to fill voids between the bundle of wires, and the cover maintains the meltable sealant material between the wires,
    wherein the first meltable sealant material includes a crosslinking agent to cause the sealant to undergo a change in viscosity characteristics when heated to a curing temperature such that the viscosity of the first meltable sealant material is initially less than about 100 Pa*s at the curing temperature and then changes to a viscosity of greater than about 1000 Pa*s at the curing temperature after crosslinking has occurred,
    wherein the thermally conductive material comprises a metal.

2. The sealing assembly according to claim 1, wherein viscosity properties of the second sealant material are different from viscosity properties of the meltable sealant material.

3. The sealing assembly according to claim 1, wherein the meltable sealant material has a viscosity less than 100 Pa-s above a temperature of about 1 10° C., and a viscosity greater than 1000 Pa- s at a temperature below about 100° C.

4. The sealing assembly according to claim 1, wherein the first and third sheets further comprise a third sealant along edges of the first and third sheets that are parallel with the second direction in which the assembly is wrapped, wherein a viscosity of the third sealant is greater than a viscosity of the meltable sealant to thereby inhibit the meltable sealant from escaping from end sections of the wrapped assembly while heat is applied to the assembly.

5. The sealing assembly according to claim 1, wherein the cover corresponds to a heat- shrinkable material.

6. A method for sealing a bond of wires comprises:
    a sealing assembly comprising:
        a first sheet formed of a sealant material;
        a second sheet disposed above the first sheet, the second sheet includes a thermally conductive material;
        a third sheet disposed above the second sheetformed of the sealant material wherein the third sheet defines a plurality of teeth on a top surface that define valleys there between for controlled placement of one or more wires of the bundles of wires,
    wherein the thermally conductive material extends from the second sheet into at least some portions of the plurality of teeth; and
    overlaying the bundle of wires on the first sheet in a first direction;
    wrapping the sealing assembly and bundle of wires together in a second direction that is generally perpendicular to the first direction; and
    applying heat to the wrapped sealing assembly, wherein the second sheet facilitates uniform thermal energy distribution of applied heat throughout the sealing assembly to thereby uniformly melt the sealant material and thereby fill voids between the wires,
    wherein the thermally conductive material comprises a metal.

7. The method according to claim 6, wherein the second sheet further comprises a second sealant material.

8. The method according to claim 7, wherein viscosity properties of the second sealant material are different from viscosity properties of the sealant material.

9. The method according to claim 6, wherein the first sealant material has a viscosity less than 100 Pa-s above a temperature of about 110° C., and a viscosity greater than 1000 Pa-s at a temperature below about 100° C.

10. The method according to claim 6, wherein the sealing assembly includes a cover, wherein the method further comprises placing the cover around the wrapped sealing assembly and the bundle of wires to inhibit melt sealant from spilling.

11. The method according to claim 10, wherein the cover corresponds to a heat-shrinkable material.

12. The method according to claim 6, wherein the first and third sheets further comprise a third sealant along edges of the first and third sheets that are parallel with the longitudinal direction in which the assembly is spirally rolled, wherein a viscosity of the third sealant is greater than a viscosity of the sealant to thereby inhibit the sealant from escaping from end sections of the wrapped assembly while heat is applied to the assembly.

13. The method according to claim 6, further comprising compressing and twisting the sealing assembly to enhance distribution of the sealant material between the voids between the wires.

14. The method according to claim 6, wherein one or more of the first, second, and third sheets includes an infrared absorbing material, and wherein applying heat to the spirally rolled assembly comprises applying infrared energy to the sealing assembly.

15. The method according to claim 6, wherein one or more of the first and second sheets includes a ferromagnetic material, and wherein applying heat to the wrapped assembly comprises applying inductive energy to the sealing assembly.

16. The sealing assembly according to claim 1, wherein a heat shrinkable material layer is disposed around the wrapped assembly and the bundle of wires.

17. The sealing assembly according to claim 1, wherein the meltable sealant material has ridges.

18. The sealing assembly according to claim 17, wherein the second sealant material extends into the ridges.

* * * * *